United States Patent Office 2,750,254
Patented June 12, 1956

2,750,254

PROCESS OF RECOVERING URANIUM FROM ITS ORES

Robert A. Blake, Leadville, Colo., assignor to the United States of America as represented by the United States Atomic Energy Commission No Drawing. Application November 16, 1949, Serial No. 127,790

6 Claims. (Cl. 23—14.5)

This invention relates to a process for extracting uranium from its ores and more particularly to an uranium recovery process wherein the ore is leached with an acid, the uranium is precipitated as sulfides and then collected in a flotation concentrate.

This invention has as an object the provision of a process for recovering uranium from an ore from which it cannot be readily recovered by conventional flotation procedures. A further object is to provide a process for modifying the uranium content of an ore in such a manner as to make the uranium readily recoverable in a flotation process. A still further object is to provide a process for treating uranium ores so as to make the uranium therein more readily flotable. Another object is to provide a suitable process for the flotation of uranium sulfides. Other objects will appear hereinafter.

These objects are accomplished in accordance with the present invention by leaching the ore with an acid to dissolve the uranium, precipitating the uranium dissolved by said acid with an alkali metal sulfide, an alkali metal hydrosulfide or hydrogen sulfide, and then separating the precipitated uranium from the rest of the ore by flotation. Usually the ore is leached with sulfuric acid and sodium sulfide is added to precipitate the uranium sulfides. Both hexavalent and quadrivalent uranium sulfides are thus precipitated if the leach solution contains both hexavalent and quadrivalent uranium.

The precipitated uranium sulfides are separated from the ore pulp by a froth flotation process wherein a sulfide collector is the chief flotation reagent used. The preferred sulfide collectors for use in the flotation step of the present invention are alkali metal alkyl xanthates and alkyl mercaptans. Among suitable alkali metal alkyl xanthates which may be used there may be mentioned potassium amyl xanthate, potassium hexyl xanthate, and the alkali metal salts of ethyl xanthate, isopropyl xanthate, butyl xanthate, and cetyl xanthate. Among the suitable alkyl mercaptans that may be employed there may be mentioned lauryl mercaptan (dodecane-thiol-1), octyl mercaptan, heptyl mercaptan, hexyl mercaptan, amyl mercaptan, butyl mercaptan, and propyl mercaptan. However, alkyl mercaptans which have less than 8 carbon atoms have such pungent and offensive odors that in spite of their technical merit as flotation reagents they are generally not utilized in the flotation step of the present invention.

While the process described above is generally applicable to uranium ores it has found particular application in the treatment of an ore tailing from which gold and palladium had been removed by a cyanide extraction after a reducing thermic treatment at 200° C., employing as a reducing agent a gas rich in CO obtained from a charcoal fed gas producer. This particular ore tailing had been exposed to tropical weathering conditions in surface reservoirs for about 10 years. This ore tailing assayed 3.30 to 3.40% in $U_3O_8$. The ore tailing was all minus 65 mesh and about 75% of it was minus 200 mesh. The uranium values were in large part in the extremely fine slimes portion of the material. The uranium occurred as several different minerals. Uranophane and sklowdowskite, the most abundant of these minerals, together accounted for about 50% of the uranium that was present. About 18% of the uranium was present as uraninite. Soddyite was the next most abundant of the uranium minerals that were present. Other uranium minerals detected in this ore include becquerelite, curite, ianthinite, kasolite, schoepite, torbernite and dewindtite. Over 80% of the uranium present was in the hexavalent state. These uranium minerals were found to be locked to one another and extremely finely intergrown with the gangue of the ore. The gangue was strongly siliceous in character with considerable of quartz, sericite, talc and chlorite in evidence. The gangue carried considerable amounts of magnesite and monazite and also carried oxidized minerals of iron, cobalt, nickel and copper, such as goethite, hematite, magnetite, stainierite, and garnierite. The gangue also carried traces of wulfenite, rutile, cassiterite, columbite, sphalerite, apatite, pyrite, serpentine, siderite, and tourmaline. The ore tailing described in this paragraph is the ore with which the experimental work described in the following examples has been carried out.

The following examples illustrate but do not limit the invention.

*Example 1*

A charge of the above described ore was pulped with three times its weight of water. Then 88.3 lbs. of $H_2SO_4$ (sp. gr. 1.84) per ton of ore was added to the ore pulp, which was then agitated for one hour. After this acid treatment which brought the pH of the ore pulp to 3.6, 60 lbs. of sodium sulfide (60–62% flakes) per ton of ore was added to the ore pulp, which thereupon became inky black in color. Five minutes of agitation with the sodium sulfide brought the pH of the ore pulp up to 6.9.

The ore pulp was then conditioned with 2 lbs. of potassium hexyl xanthate per ton of ore and 0.1 lb. of pine oil per ton of ore and placed in a flotation machine. After flotation had been carried on for 10 minutes 2 lbs. of potassium hexyl xanthate per ton of ore and 20 lbs. of caustic soda per ton of ore were added thereto and flotation was carried on for another 10 minutes. A tough, fairly voluminous, black sooty froth which was easily broken down with a water spray was thereby obtained. The pulp was noticeably lighter in color at the end of 20 minutes of flotation. The flotation concentrate thus obtained contained 34.92% of the weight of the ore and 81.51% of the uranium values of the ore and assayed 8.21% in $U_3O_8$.

*Example 2*

A charge of the above described ore was pulped with three times its weight of water. Then 88.3 lbs. of $H_2SO_4$ (sp. gr. 1.84) per ton of ore was added to the ore pulp, which was then agitated for one hour. After this acid treatment the ore pulp was treated with 100 lbs. of sodium sulfide (60–62% flakes) per ton of ore and 4 lbs. of caustic soda per ton of ore. This latter treatment brought the pH of the ore pulp up to 8.1.

The ore pulp was then conditioned with 14 lbs. of potassium amyl xanthate per ton of ore and 0.05 lb. of pine oil per ton of ore and placed in a flotation machine. Flotation was carried on for 20 minutes. The flotation concentrate thus obtained was cleaned by flotation for 5 minutes without the addition of further reagents. The cleaner concentrate thus obtained was recleaned by flotation for five minutes without the addition of further reagents. The recleaner concentrate thus obtained contained 8.19% of the weight of the ore and 40.52% of the uranium values of the ore and assayed 17.15% in $U_3O_8$. The recleaner tailing contained 4.71% of the weight of the ore and 11.81% of the uranium values of the ore and assayed 8.69% in $U_3O_8$. The cleaner tailing contained 15.58% of the weight of the ore and 21.56% of the uranium values of the ore and assayed 4.79% in $U_3O_8$. The rougher tailing contained 71.52% of the weight of the ore and 26.11% of the uranium values of the ore and assayed 1.27% in $U_3O_8$.

The rougher tailing was pulped with 16 lbs. of sodium lignin sulfonate per ton and then deslimed. The sand fraction obtained from the desliming operation constituted 78.8% of the weight of the tailing and assayed 0.31% in $U_3O_8$. The slime fraction of the rougher tailing assayed 4.83% in $U_3O_8$.

*Example 3*

A charge of the above described ore was pulped with twice its weight of water. 88.3 lbs. of $H_2SO_4$ (sp. gr. 1.84) per ton of ore was added to the ore pulp, which was then agitated for 24 hours. After this acid treatment, 100 lbs. of sodium sulfide (60–62% flakes) per ton of ore was mixed with the ore pulp which thereupon attained a pH of 7.5.

The ore pulp was then conditioned with 12 lbs. of potassium amyl xanthate per ton of ore and 0.05 lb. of pine oil per ton of ore and placed in a flotation machine. Flotation was carried on for 30 minutes. A flotation concentrate was thereby obtained which contained 38.33% of the weight of the ore and 91.93% of the uranium values of the ore. The flotation tailing contained 61.67% of the weight of the ore and 8.07% of the uranium values thereof and assayed 0.46% in $U_3O_8$.

In a test which was carried out like that described in the preceding paragraphs except that 80 instead of 100 lbs. of sodium sulfide was mixed with the ore pulp it was found that 30.02% of the weight of the ore and 84.07% of the uranium values of the ore floated. The flotation tailing thus obtained contained 69.98% of the weight of the ore, 15.93% of the uranium values of the ore, and assayed 0.802% in $U_3O_8$. This latter test showed that the use of a smaller amount of sodium sulfide decreased the recovery of uranium.

*Example 4*

A charge of the above described ore was pulped with twice its weight of water. 44 lbs. of $H_2SO_4$ (sp. gr. 1.84) per ton of ore was added to the ore pulp, which was then agitated for 24 hours. An additional 44 lbs. of $H_2SO_4$ (sp. gr. 1.84) per ton of ore was then added to the ore pulp which was agitated for an additional hour. After this acid treatment, the ore pulp was treated with 100 lbs. of sodium sulfide (60–62% flakes) per ton of ore, which brought the pH of the ore pulp up to 7.2.

The ore pulp was then conditioned with 12 lbs. of potassium amyl xanthate per ton of ore and placed in a flotation machine. Flotation was carried on for 20 minutes. The rougher concentrate was placed in a cleaner cell and subjected to flotation for 5 minutes. The cleaner concentrate was in turn subjected to flotation in a recleaner cell for 5 minutes to give recleaner concentrate #1.

The cleaner and recleaner tailings thus obtained were combined and recycled thru the rougher, cleaner and recleaner flotation cells where they were subjected to flotation without any addition of reagents for periods of 20 minutes, 5 minutes and 5 minutes, respectively. As a result of this recycling rougher tailing #2 and recleaner concentrate #2 were obtained.

The cleaner and recleaner tailings obtained in this recycling were in turn combined and recycled thru the rougher, cleaner and recleaner flotation cells where they were subjected to flotation without any addition of reagents for periods of 20 minutes, 5 minutes and 5 minutes, respectively. As a result of this second recycling rougher tailing #3 and recleaner concentrate #3 were obtained.

The cleaner and recleaner tailings obtained in this second recycling were in turn combined and recycled thru the rougher, cleaner and recleaner flotation cells where they were subjected to flotation for periods of 20 minutes, 5 minutes and 5 minutes respectively. 1 lb. of potassium amyl xanthate per ton of ore was added to the cleaner and recleaner cells during this third and final recycling to assist in floating sulfide precipitates. As a result of this third and final recycling rougher tailing #4 and recleaner concentrate #4 were obtained along with the final cleaner tailing and the final recleaner tailing.

Recleaner concentrates #1, #2, #3, and #4 when combined contained 10.99% of the weight of the ore and 60.85% of its uranium values, and assayed 19.13% in $U_3O_8$. The final recleaner tailing contained 2.48% of the weight of the ore and 6.42% of its uranium values, and assayed 8.95% in $U_3O_8$. The final cleaner tailing contained 5.47% of the weight of the ore and 9.16% of its uranium values, and assayed 5.78% in $U_3O_8$. Rougher tailings #1, #2, #3, and #4 when combined contained 81.06% of the weight of the ore and 23.57% of its uranium values and assayed 1% in $U_3O_8$.

*Example 5*

A charge of the above described ore was pulped with 1.6 times its weight of water. 110 lbs. of $H_2SO_4$ (sp. gr. 1.84) per ton of ore was added to the ore pulp which was then agitated for 36 hours. After this acid treatment, 100 lbs. of sodium sulfide (60–62% flakes) per ton of ore was mixed with the ore pulp. Then 4 lbs. of sodium hydroxide per ton of ore was added to the ore pulp bringing its pH to 7.3.

The ore pulp was then conditioned with 6 lbs. of lauryl mercaptan (dodecanethiol-1) per ton of ore and 0.05 lb. of pine oil per ton of ore and placed in a flotation machine. Flotation was carried on for 5 minutes after which 6 lbs. more of lauryl mercaptan per ton of ore was added to the ore pulp. Flotation was then continued for 15 more minutes. As a result of these operations a flotation concentrate was obtained which contained 34% of the weight of the ore and 90.93% of its uranium values and assayed 9.76% in $U_3O_8$. The flotation tailing contained 66% of the weight of the ore and 9.07% of its uranium values and assayed 0.5% in $U_3O_8$.

When the ore was processed exactly as described in the two preceding paragraphs but equal weights of potassium amyl xanthate were used in place of the lauryl mercaptan that had been used, the flotation concentrate thus obtained contained 30.07% of the weight of the ore and 93.97% of its uranium values and assayed 10.51% in $U_3O_8$. The flotation tailing thus obtained contained 69.93% of the weight of the ore and 6.03% of its uranium values and assayed 0.29% in $U_3O_8$.

The above description and examples are intended to be illustrative only and not to limit the scope of the invention. Resort may be had to any variation which conforms to the spirit of the invention and comes within the scope of the appended claims.

I claim:

1. A process for extracting uranium from an ore thereof which comprises leaching said ore with an acid, precipitating the uranium dissolved by said acid with a sulfide selected from the group consisting of alkali metal sulfides, alkali metal hydrosulfides and hydrogen sulfide, and then separating the precipitated uranium from the rest of the ore by flotation.

2. A process for recovering uranium from an ore thereof which comprises leaching said ore with sulfuric acid, precipitating the uranium dissolved by said acid with an alkali metal sulfide, and then separating the precipitated uranium from the remainder of the ore by a froth flotation process utilizing a sulfide collector.

3. A process for recovering uranium from an ore thereof which comprises leaching said ore with sulfuric acid, precipitating the uranium dissolved by said acid with an alkali metal sulfide to give an ore pulp containing leach residues and precipitated uranium sulfides, adding to said ore pulp a sulfide collecting flotation reagent selected from the group consisting of alkali metal alkyl xanthates and alkyl mercaptans, and then subjecting the ore pulp to froth flotation to separate the precipitated uranium sulfides from the rest of the ore.

4. A process as defined in claim 3 wherein the flotation reagent used is potassium amyl xanthate.

5. A process as defined in claim 3 wherein the flotation reagent used is potassium hexyl xanthate.

6. A process as defined in claim 3 wherein the flotation reagent used is lauryl mercaptan.

References Cited in the file of this patent

UNITED STATES PATENTS 2,000,656    Armstrong et al. _____ May 7, 1935